Feb. 19, 1935.                     C. SAUZEDDE                     1,991,421
                                  FLUID COMPENSATOR
                                 Filed Dec. 1, 1932

INVENTOR
Claude Sauzedde
BY
ATTORNEYS

Patented Feb. 19, 1935

1,991,421

UNITED STATES PATENT OFFICE 1,991,421

FLUID COMPENSATOR

Claude Sauzedde, Detroit, Mich., assignor to Detroit Hydrostatic Brake Corporation, Detroit, Mich., a corporation of Michigan Application December 1, 1932, Serial No. 645,322

7 Claims. (Cl. 60—54.6)

The present invention relates to a novel fluid compensator of a type particularly adapted for use in combination with fluid actuated brake systems.

The primary object of the present invention is to provide a fluid compensator of a type adapted for use in combination with fluid actuated brake systems on automotive vehicles, and having control means adapted to be mounted for convenience of operator on the dash of the vehicle, the purpose of the device being to compensate for wear of brake-shoe linings, loss of fluid due to leakage, and for volumetric variations due to pronounced temperature changes in the fluid in the brake system such as arise with change of seasons from summer to winter.

With the above and other ends in view the invention consists in matters hereinafter set forth and more particularly pointed out in the appended claims, reference being had to the accompanying drawing, in which Figure 1 is an end elevation of the present compensator showing pipe connections thereto;

Like characters of reference are employed throughout to designate corresponding parts.

Figure 1:
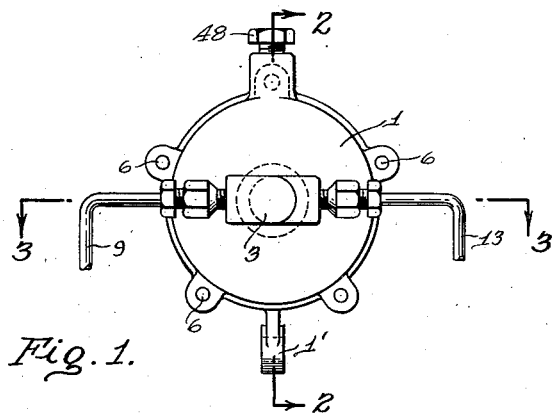
Figure 2:
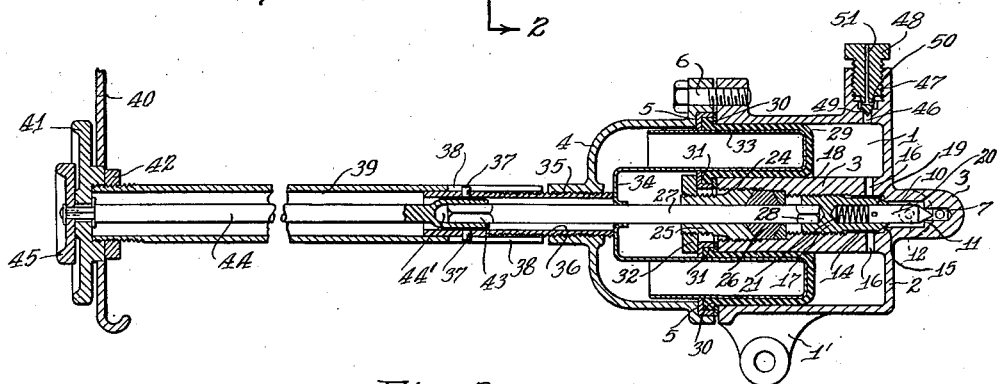
Fig. 2 is a cross section taken on the line 2—2 of Fig. 1.
Figure 3:
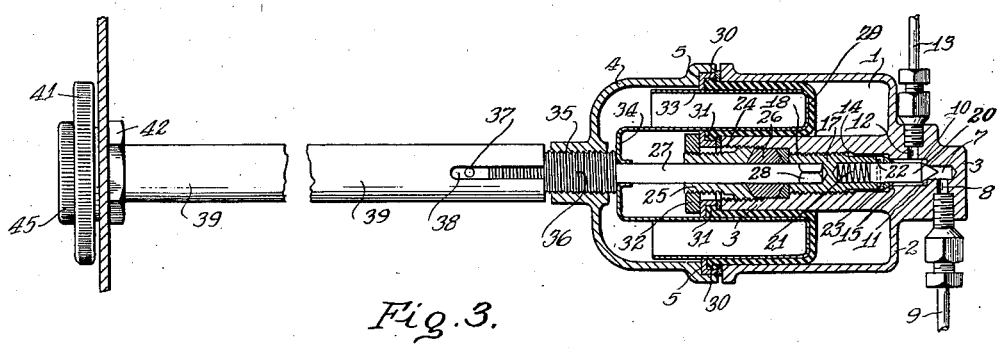
Fig. 3 is a cross-section taken on the line 3—3 of Fig. 1.

The numeral 1 indicates a compensator cylinder having an end wall 2 formed with an internally and externally projecting portion 3 which serves as a valve body. A cup-shaped closure cap 4 is recessed to form a shoulder 5 and is secured to the compensator cylinder 1 by means of bolts 6. A bracket 1' is formed integral with the cylinder 1 and provides means for attachment to a support.

In the valve body 3 is formed a bore 7 having a passage 8 communicating therewith and adapted to be connected by a pipe line 9 to a device which requires a quantity of fluid at times, such as a compressor in a fluid-actuated brake system. Co-axial with the bore 7, and of greater diameter, is formed a bore 10 in a manner to form a shoulder designated as valve seat 11. Communicating with the bore 10 is a passage 12 that is connected by a pipe line 13 to a device requiring fluid supply at times, such as a compressor in a fluid-actuated brake system. An example of one of the many uses of the present device is in combination with a fluid actuated brake system of the well known type wherein a pair of compressors are provided to independently actuate front and rear brakes on an automobile, the two compressors being entirely separate so that fluid cannot leak from one compressor through the other in the case of an accidentally broken line.

Co-axial with the bore 10, and of greater diameter, is formed a bore 14 in a manner to form a shoulder designated as valve seat 15. A plurality of radially extending passages 16 provide means of communication between the bore 14 and the interior of the compensator cylinder 1.

A tapered valve head 17 is provided with a screw threaded portion which is received in a screw threaded portion 18 of the bore 14 so that rotation of said head 17 causes the same to move longitudinally and accordingly move into or out of contact with the valve seat 15 to prevent communication between the bore 14 and bore 10. The valve head 17 is provided with an axial chamber 19 in which is slidably received a secondary valve head 20. The secondary valve head 20 is backed by a compressed coiled spring 21 which normally urges the secondary valve head out of said chamber 19, and to prevent such action taking place there is provided a pin 22 in the secondary valve head 20 which is received in a slot 23 in the valve head 17.

In the outermost portion of the valve body 3 is formed a screwthreaded bore 24 in which is received an axially pierced nut 25 and packing gland 26 through which extends a rod 27 having a squared end 28 received in the valve head 17. A seal 29 formed of flexible expansible and contractible material is received in the compensator cylinder 1 and surrounds the valve body 3. The seal has an outwardly projecting flange 30 which becomes tightly interposed between the shoulder 5 and the end of the cylinder 1 when the bolts 6 are tightened. An inwardly projecting flange 31 is formed on the portion of the seal which surrounds the valve body 3 and is tightly interposed between the end of the valve body 3 and a nut 32 that is screwthreaded onto the nut 25. A piston 33 is received within the seal 29 and is provided with an end wall 34 that freely surrounds the rod 27.

The closure cap 4 is provided with a screwthreaded bore 35 in which is received a screwthreaded sleeve 36 having one end engaging the wall 34 of the piston 33 and its other end provided with radially extending pins 37. The pins 37 are slidably received in slots 38 formed in the end of a tube 39 that extends through a dashboard 40 of an automobile, a knob 41 being screw threaded onto the end of the tube and secured against movement by a lock nut 42. The rod 27 extends into the sleeve 36 and its outer end is provided with an angular portion 43 that projects into a similarly shaped recess 44' in the end of a rod 44 which extends through the tube 39 and knob 41 and which has a knob 45 keyed on the outer end thereof.

Communicating with the interior of the compensator chamber 1 is a passage 46 leading to a screw threaded bore 47 in which is received a plug 48 having a conical valve portion 49 adapted to seat on the upper end of the passage 46. Above the conical valve portion are formed radial passages 50 that communicate with an axial passage 51.

In operation the knob 41 is rotated to rotate the sleeve 36 in a manner to retract the same from the closure cap 4 and thus permit the seal 29 to move the piston 33 until the wall 34 engages the end of the closure cap. The knob 45 is at the same time rotated in a manner to rotate the valve head 17 and retract the end thereof from the valve seat 15 and at the same time carry the secondary valve head 20 away from the valve seat 11. The plug 48 is then removed from the bore 47 and the cylinder 1, bores 14 and 7, lines 9 and 13, and the devices connected to said lines (brakes and fluid compressors for example) are filled with fluid through the bore 47. When the device is filled the plug 48 is inserted in the bore 47 so that the conical valve portion 49 does not seat on the passage 46. The knob 41 is then rotated in a manner to rotate the sleeve 36 to force the piston 33 to exert pressure on the fluid in the cylinder 1. When the piston is moved until fluid may be seen discharging through the axial passage 51 in the plug 48 it becomes known that there is no air in the parts described and at this time the plug 48 is screwed down to seat the conical valve portion 49 on the passage 46.

At the stage of operation described above the cylinder 1 and bores connected thereto are filled with fluid, so that continued movement of the piston 33 resulting from continued rotation of the knob 41 causes a movement of the fluid from the cylinder to the lines 9 and 13 and to the devices connected thereto. When the required amount of fluid has been supplied through the lines 9 and 13 the knob 45 is rotated to move the valve 17 into contact with the valve seat 15 and the secondary valve head 20 into contact with the valve seat 11. At this stage of operation there is no communication between the cylinder 1 and either line 9 or 13 or between the two lines 9 and 13.

From the description of the manner in which the secondary valve head 20 is secured in the valve head 17 by the pin 22 that is received in slots 23 with the spring 21 forcing the secondary valve head outwardly it becomes apparent that the valve head 17 may be moved off its seat 15 a distance that permits the secondary valve head 20 to remain on the seat 11 as a result of the pressure of the spring 21. In this manner it becomes possible to force fluid from the cylinder 1 through the line 13 without forcing it through the line 9.

Although a specific embodiment of the present invention has been illustrated and described it is to be understood that various changes may be made within the scope of the appended claims without departing from the spirit of the invention, and such changes are contemplated.

What I claim is:

1. A device of the character described including a chamber having valve controlled outlets, valve means therefor rendered active and inactive by axial movement, a piston slidably mounted in said chamber, a tubular member having one end adapted to be received in the dashboard of a vehicle and adapted by rotation to move said piston, and means within said tubular member and adapted to extend through said dashboard and adapted upon rotation to operate the valve means controlling said passages, said tubular member and extensible means respectively having portions exposed on the dashboard with the exposed portions movable solely rotatively and held against axial movement relative to the dashboard.

2. A device of the character described including a cylindrical member, a valve body formed in said cylindrical member, valves in said body operative to control passages communicating with said cylinder, a piston slidably mounted in said cylindrical member and surrounding said valve body, a tubular member extending through said cylindrical member and engaging said piston, and an extensible rod formation extending through said tubular member and engaging said valves.

3. A device of the character described including a cylindrical member, a valve body formed in said cylindrical member, valves in said body operative to control passages communicating with said cylinder, a piston slidably mounted in said cylindrical member and surrounding said valve body, a flexible seal surrounding said piston and having flanges secured to said cylindrical member and to said valve body, a tubular member extending through said cylindrical member and engaging said piston, said member being operative by rotation to move the piston, and an extensible rod extending through and supported by said tubular member and engaging said valves.

4. A device of the character described including a cylinder having a cup-like cap bolted to the open end thereof, a valve body having passages communicating with said cylinder and with supply lines, valves controlling said passages, a piston in said cylinder and surrounding said valve body, a sleeve received in a screw threaded bore in said cap and engaging said piston for actuating the latter, means for rotating said sleeve, an extensible rod extending through and supported by said sleeve and engaging said valves, and means for rotating said rod to operate said valves.

5. A device of the character described including a cylinder having a cup-like cap bolted to the open end thereof, a valve body having passages communicating with said cylinder and with supply lines, valves controlling said passages, a rod for operating said valves, a piston in said cylinder and surrounding said valve body, a sleeve received in a screw threaded bore in said cap and engaging said piston for actuating the latter, a tubular operating member having one end operatively connected to said sleeve and its opposite end adapted to project through the dashboard of a vehicle, and a rod operatively connected to said first named rod within and extending through said tubular operating member to said dashboard.

6. A device as in claim 5 characterized in that the operating member and the operating rod have individual axially-alined finger pieces exposed on the dashboard of the vehicle, said finger pieces being individually rotatable and positioned in overlapping relation, said finger-pieces being held from movement in the direction of their axes.

7. As a means for replenishing the supply of actuating fluid in individual systems of fluid-actuated brake mechanisms from a single source, a container having a supply chamber and a pair of passages leading to the systems, a valve body having ported communication between the chamber and said passages, valve means for controlling said ported communications to permit one or both passages to be in open communication with th chamber, a piston movable in said chamber, and individual means carried by the dashboard of the vehicle and operatively connected with the valve means and piston respectively, by axially alined connections to permit piston and valve movements by rotation of the means, said individual means being exposed on the dashboard for movements relative to each other and to the dashboard with the movements limited to rotation in single planes, said valve means being rendered active and inactive by movement in the direction of the valve means axis, with the valve means constructed and arranged to selectively control the number of passages in open communication with the chamber by the length of movement of the valve means in the direction of such axis.

CLAUDE SAUZEDDE.